(12) United States Patent
Ding et al.

(10) Patent No.: US 12,305,622 B2
(45) Date of Patent: May 20, 2025

(54) CONCENTRATED SOLAR POWER STORAGE SYSTEM AND METHOD

(71) Applicant: POWER8 TECH INC., Los Gatos, CA (US)

(72) Inventors: Lien Chun Ding, Taoyuan (TW); Chih Cheng Tai, Campbell, CA (US)

(73) Assignee: Power8 Tech. Inc., Los Gatos, CA (US)

( * ) Notice: Subject to any disclaimer, the term of this patent is extended or adjusted under 35 U.S.C. 154(b) by 0 days.

(21) Appl. No.: 18/367,065

(22) Filed: Sep. 12, 2023

(65) Prior Publication Data

US 2024/0084787 A1   Mar. 14, 2024

Related U.S. Application Data

(60) Provisional application No. 63/405,974, filed on Sep. 13, 2022.

(51) Int. Cl.
| | |
|---|---|
| *F03G 6/06* | (2006.01) |
| *F03G 6/00* | (2006.01) |
| *F24S 20/25* | (2018.01) |
| *F24S 20/40* | (2018.01) |
| *F24S 60/30* | (2018.01) |
| *F24S 80/30* | (2018.01) |
| *F24T 10/20* | (2018.01) |

(52) U.S. Cl.
CPC ............. *F03G 6/064* (2013.01); *F03G 6/074* (2021.08); *F24S 20/25* (2018.05); *F24S 20/40* (2018.05); *F03G 6/108* (2021.08); *F24S 60/30* (2018.05); *F24S 80/30* (2018.05); *F24T 10/20* (2018.05)

(58) Field of Classification Search
CPC . F03G 6/00; F03G 6/002; F03G 6/064; F03G 6/074; F03G 6/108; F24S 10/00; F24S 20/20; F24S 20/25; F24S 20/40; F24S 60/30; F24S 80/30; F24T 10/20
See application file for complete search history.

(56) References Cited

U.S. PATENT DOCUMENTS

| | | | |
|---|---|---|---|
| 2,652,690 A | 9/1953 | Labriola | |
| 3,991,574 A * | 11/1976 | Frazier | F02G 1/043 60/645 |
| 4,206,608 A | 6/1980 | Bell | |
| 4,220,006 A | 9/1980 | Kindt | |

(Continued)

FOREIGN PATENT DOCUMENTS

| | | |
|---|---|---|
| CN | 102966387 A | 3/2013 |
| CN | 103925111 A | 7/2014 |

(Continued)

OTHER PUBLICATIONS

International Search Report in International Application No. PCT/US2023/32578, mailed on Jan. 4, 2024, 9 pages.

(Continued)

*Primary Examiner* — Loren C Edwards
(74) *Attorney, Agent, or Firm* — Haverstock & Owens, A Law Corporation (57) ABSTRACT

A concentrated solar power storage system and method convert water into water vapor by the solar thermal energy, and the water vapor further operates a hydroelectric power generation system with a water storage (or an energy storage capsule) through a repeated conversion process.

6 Claims, 6 Drawing Sheets

(56) References Cited

U.S. PATENT DOCUMENTS

| | | | |
|---|---|---|---|
| 4,367,786 A | 1/1983 | Hafner et al. | |
| 4,525,631 A | 6/1985 | Allison | |
| 6,109,358 A | 8/2000 | McPhee | |
| 6,718,761 B2 | 4/2004 | Merswolke | |
| 7,168,252 B1 * | 1/2007 | Price | F03G 6/062 60/641.11 |
| 7,281,371 B1 | 10/2007 | Heidenreich | |
| 7,364,810 B2 | 4/2008 | Sridhar et al. | |
| 7,579,700 B1 | 8/2009 | Meller | |
| 7,663,255 B2 | 2/2010 | Kim | |
| 7,743,609 B1 | 6/2010 | Brostmeyer | |
| 7,878,280 B2 | 2/2011 | Sridhar et al. | |
| 8,037,678 B2 | 10/2011 | McBride et al. | |
| 8,127,542 B1 | 3/2012 | Dolcimascolo | |
| 8,240,956 B2 | 8/2012 | Lewis | |
| 8,723,347 B2 | 5/2014 | Crane et al. | |
| 8,739,533 B2 | 6/2014 | Yogev et al. | |
| 8,806,866 B2 | 8/2014 | McBride et al. | |
| 8,823,195 B2 | 9/2014 | Legacy | |
| 9,059,605 B2 | 6/2015 | Murray et al. | |
| 9,261,068 B2 | 2/2016 | Barakat | |
| 9,410,559 B2 | 8/2016 | VanWalleghem et al. | |
| 9,422,948 B2 | 8/2016 | Kim et al. | |
| 9,444,378 B2 | 9/2016 | Fong et al. | |
| 9,562,521 B2 | 2/2017 | Yogev | |
| 9,797,366 B2 | 10/2017 | Schmidt-Boecking et al. | |
| 10,203,735 B2 | 2/2019 | Gross et al. | |
| 10,205,323 B2 | 2/2019 | Lowell | |
| 10,208,737 B1 | 2/2019 | Freeman | |
| 10,344,741 B2 | 7/2019 | Sant et al. | |
| 10,415,469 B2 | 9/2019 | Blount | |
| 10,655,505 B2 | 5/2020 | Matsukuma et al. | |
| 10,707,802 B1 | 7/2020 | Materna | |
| 10,823,132 B2 | 11/2020 | Mesinger et al. | |
| 10,836,579 B2 | 11/2020 | Yogev | |
| 10,837,429 B2 | 11/2020 | Pedretti et al. | |
| 10,859,207 B2 | 12/2020 | Lewis et al. | |
| 11,274,792 B2 | 3/2022 | Stradiotto et al. | |
| 11,387,707 B2 | 7/2022 | Yogev | |
| 11,404,935 B2 | 8/2022 | Yogev | |
| 2002/0144503 A1 | 10/2002 | Merswolke et al. | |
| 2005/0155347 A1 | 7/2005 | Lewellin | |
| 2005/0198959 A1 | 9/2005 | Schubert | |
| 2005/0279085 A1 | 12/2005 | Moore | |
| 2007/0289622 A1 | 12/2007 | Hecht | |
| 2008/0136186 A1 | 6/2008 | Gogoana et al. | |
| 2008/0211230 A1 | 9/2008 | Gurin | |
| 2009/0152871 A1 | 6/2009 | Ching | |
| 2010/0089063 A1 | 4/2010 | McBride | |
| 2010/0096858 A1 | 4/2010 | Riley | |
| 2010/0192568 A1 | 8/2010 | Peacock | |
| 2010/0205960 A1 | 8/2010 | McBride | |
| 2010/0252028 A1 | 10/2010 | Mierisch et al. | |
| 2010/0270801 A1 | 10/2010 | Liu | |
| 2010/0326062 A1 | 12/2010 | Fong et al. | |
| 2011/0030361 A1 | 2/2011 | Gopalswamy | |
| 2011/0041490 A1 | 2/2011 | Gogoana et al. | |
| 2011/0120673 A1 | 5/2011 | Xiang et al. | |
| 2011/0259007 A1 | 10/2011 | Aoyama et al. | |
| 2011/0268804 A1 | 11/2011 | Dolcimascolo | |
| 2011/0296822 A1 | 12/2011 | Bollinger et al. | |
| 2012/0305411 A1 | 12/2012 | Elazari-Volcani | |
| 2013/0134612 A1 | 5/2013 | Lewis et al. | |
| 2013/0214537 A1 * | 8/2013 | Hashimoto | F03D 15/00 290/55 |
| 2013/0219892 A1 | 8/2013 | Havel | |
| 2013/0220310 A1 | 8/2013 | Gregory et al. | |
| 2014/0026547 A1 | 1/2014 | Kim et al. | |
| 2015/0000248 A1 | 1/2015 | del Omo | |
| 2015/0211551 A1 | 7/2015 | VanWelleghem et al. | |
| 2016/0178129 A1 | 6/2016 | Chen et al. | |
| 2016/0201658 A1 | 7/2016 | Arapkoules | |
| 2016/0348637 A1 | 12/2016 | Bachli | |
| 2017/0264164 A1 | 9/2017 | Lenk et al. | |
| 2018/0306066 A1 | 10/2018 | Yesil | |
| 2018/0320679 A1 | 11/2018 | Enis et al. | |
| 2019/0003384 A1 | 1/2019 | Bannari | |
| 2019/0052094 A1 | 2/2019 | Pmsvvsv et al. | |
| 2019/0064757 A1 | 2/2019 | Ramamurthy | |
| 2019/0221697 A1 | 7/2019 | Cho | |
| 2020/0263830 A1 | 8/2020 | Stradiotto et al. | |
| 2021/0071632 A1 | 3/2021 | Gudesen | |
| 2021/0075296 A1 | 3/2021 | Yogev | |
| 2021/0206574 A1 | 7/2021 | Yogev | |
| 2021/0221652 A1 | 7/2021 | Pedretti et al. | |
| 2021/0351615 A1 | 11/2021 | Yogev | |
| 2021/0388810 A1 | 12/2021 | Young et al. | |
| 2021/0404446 A1 | 12/2021 | Pedretti et al. | |
| 2022/0090585 A1 | 3/2022 | Lewis et al. | |
| 2022/0243701 A1 | 8/2022 | Pedretti et al. | |

FOREIGN PATENT DOCUMENTS

| | | | |
|---|---|---|---|
| CN | 103216426 B | 2/2016 | |
| CN | 106091403 A | 11/2016 | |
| CN | 105043147 B | 1/2017 | |
| CN | 102797613 B | 3/2017 | |
| CN | 107002641 A | 8/2017 | |
| CN | 104675680 B | 12/2017 | |
| CN | 106677848 B | 3/2018 | |
| CN | 106499612 B | 6/2018 | |
| CN | 109826741 A | 5/2019 | |
| CN | 108571415 B | 12/2019 | |
| CN | 111636991 A | 9/2020 | |
| CN | 112360584 A | 2/2021 | |
| CN | 112459980 A | 3/2021 | |
| CN | 114198242 A | 3/2022 | |
| CN | 114934869 B | 8/2022 | |
| JP | 0617555 A | 1/1994 | |
| JP | 2015145674 A | 8/2015 | |
| TW | M375775 U | 3/2010 | |
| TW | 201241308 A | 10/2012 | |
| TW | M440345 U | 11/2012 | |
| TW | M446825 U | 2/2013 | |
| TW | 202108950 A * | 3/2021 | Y02E 10/144 |
| WO | 2011024928 A1 | 3/2011 | |
| WO | 2011076926 A2 | 6/2011 | |
| WO | 2015159278 A1 | 10/2015 | |
| WO | WO2021078568 A1 | 4/2021 | |

OTHER PUBLICATIONS

International Search Report mailed Apr. 1, 2024 in International Application No. PCT/US 23/81234, 15 pages.
International Preliminary Report dated Jun. 13, 2024 in International Application No. PCT/US2022/029374.
TIPO Search Report in Taiwan Application No. 112118947.
TIPO Search Report in Taiwan Application No. 112120898.
TIPO Search Report in Taiwan Application No. 112118938.
TIPO Search Report in Taiwan Application No. 112128677.
Notification Concerning Transmittal of International Preliminary Report on Patentability dated Dec. 5, 2024 issued in PCT Patent Application No. PCT/US2023/023060.
Notification Concerning Transmittal of International Preliminary Report on Patentability dated Dec. 5, 2024 issued in PCT Patent Application No. PCT/US2023/023063.
Notification Concerning Transmittal of International Preliminary Report on Patentability dated Dec. 19, 2024 issued in PCT Patent Application No. PCT/US2023/024400.

* cited by examiner

CONCENTRATED SOLAR POWER STORAGE SYSTEM AND METHOD

CROSS-REFERENCE TO RELATED APPLICATIONS

This application claims priority to U.S. Provisional Application No. 63/405,974, filed on Sep. 13, 2022, and entitled "CONCENTRATED SOLAR POWER STORAGE SYSTEM AND METHOD." This application is incorporated herein by reference for all purposes.

FIELD OF THE INVENTION

The present invention relates to green (renewable) energy power generation and storage. Specifically, the present invention relates to a concentrated solar power storage system and method.

BACKGROUND OF THE INVENTION

Typical Concentrated solar power (CSP, also known as concentrating solar power, concentrated solar thermal) systems generate solar power by using mirrors or lenses to concentrate a large area of sunlight onto a receiver. Electricity is generated when the concentrated light is converted to heat (solar thermal energy), which is used to heat water to generate steam for driving a heat engine (usually a steam turbine) connected to an electrical power generator or powers a thermochemical reaction.

SUMMARY OF THE INVENTION

The present disclosure uses a pressure source (e.g., water vapor, etc.) to drive an actuator, which in term pushes an amount of liquid (e.g., water, etc.) to drive a water turbine generator. In particular, the pressure source comes from energy from the natural environment, such as geothermal heat, waste heat (e.g., factory generated waste heat, boiler unused heat, and coal fired furnace plant generated heat), solar energy, and garbage combustion, which can be converted and reused to produce zero or very low carbon emissions.

In some embodiments, the present disclosure utilizes natural energy to heat normal temperature water to a boiling status to generate water vapor or uses naturally produced high temperature to form a water vapor to generate electricity. The water vapor is generated, and the pressure source is generated through, for example, the valve and the plug to push the water into, for example, the water storage capsule. The water stored in the water storage capsule will be able to drive the water turbine further to generate electricity by controlling the flow rate and amount of flowing water.

In some embodiments, the present disclosure utilizes concentrated solar energy to collect the heat of sunlight. It uses, for example, a concave lens to focus the solar energy onto a focal point of the lens so that the concentrated hot spot generates a high temperature. The high temperature of the hot spot can heat water to become vapor directly. Therefore, water vapor continues to be generated as the solar energy continues to generate a high temperature at the hot/focal spot. Concentrated solar energy can develop a repeatable, environmentally friendly, and control system by recycling water vapor to become water again and re-heating it at a high temperature to generate water vapor repeatedly. Since the system can convert/recover and heat the water with solar energy, it is also called "a zero-carbon cycle control system."

In addition, the zero-carbon cycle control system further has an energy storage. The power generation cycle system comprises a water storage capsule (or an energy storage capsule) and a water turbine generator, which can generate electricity repeatedly.

An aspect of the present disclosure provides a concentrated solar power storage system comprising: a heat collecting unit for gathering a solar thermal energy; a water inlet unit for storing a water and converting the water into steam by the solar thermal energy; a controller for determining a flow direction of the steam; an action unit for generating a force through the controller; an energy storage capsule for accommodating a gas; a generator; a fluid storage tank; a first fluid pipe for accommodating a fluid (e.g., liquid), the first fluid pipe being connected to the energy storage capsule, the generator, and the fluid storage tank; and a second fluid pipe connected to the action unit and the fluid storage tank, wherein the force is used to push the fluid located in the first fluid pipe to compress the gas; wherein the generator is used to generate electricity by using the compressed gas to push the fluid located in the first fluid pipe; and wherein the fluid storage tank is used to receive the fluid acting on the generator.

Another aspect of the present disclosure provides an energy storage system comprising: an energy storage container storing an initial gas; a force generating device providing a force to drive the initial gas to be pressurized; and a heat transfer device gathering thermal energy driving the force generating device to provide the force.

Another aspect of the present disclosure provides an energy storage method comprising: collecting heat from a heat source; allowing a fluid to enter a container storing gas by using the heat; allowing the fluid to come out from the container; and generating electricity by using the come out fluid to push a generator.

Solar energy is especially suitable for latitudes/areas on earth with sufficient sunlight or desert areas.

BRIEF DESCRIPTION OF THE DRAWINGS

Embodiments will now be described by way of examples, with reference to the accompanying drawings which are meant to be exemplary and not limiting. For all figures mentioned herein, like-numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications, and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made to achieve the developer's specific goals, such as compliance with application and business-related constraints, and that these specific goals vary from one implementation to another and from one developer to another. Moreover, it is appreciated that such a development effort can be complex and time-consuming but is nevertheless a routine undertaking of engineering for those of ordinary skill in the art having the benefit of this disclosure.

Although concentrated solar power is disclosed here, the present disclosure includes using any solar power or lights as a heat source for energy storage.

Figure 1:
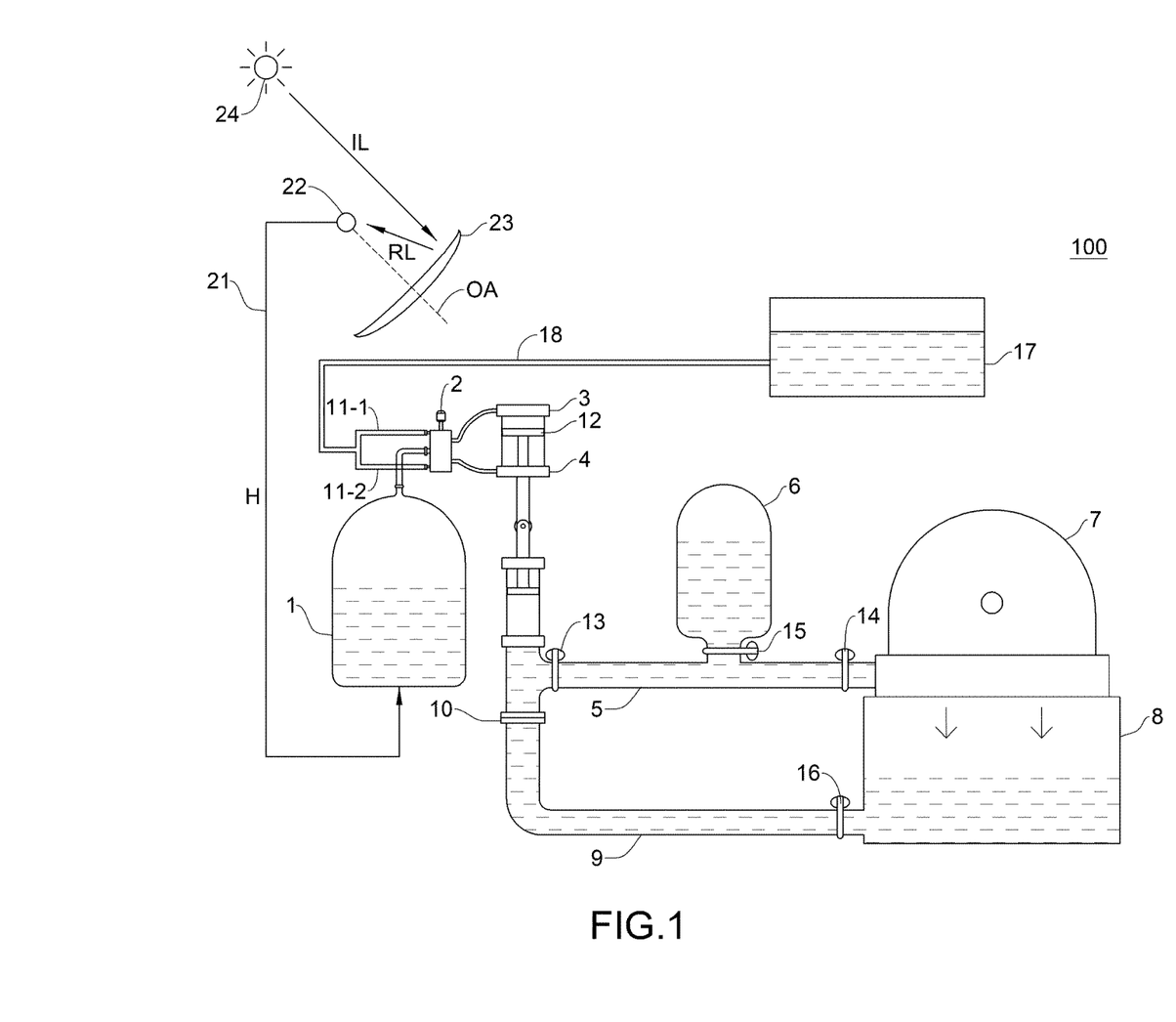
FIG. 1 illustrates a structural diagram of a power generator and/or storage in accordance with some embodiments.

FIG. 1 illustrates a structural diagram of a power generator and/or storage in accordance with some embodiments. The power generator and storage can be driven/powered by solar power. In the FIG. 1, the concentrated solar power storage system 100 includes a concave lens 23, a water inlet unit 1 (used as an example of a water storage unit), a controller 2, a piston 12, first inlet hole 3, second inlet hole 4, first water pipe 5 (used as an example of a first fluid pipe), a water storage capsule 6 (e.g., used as an example of an energy storage capsule), a generator 7, a water storage tank 8 (used as an example of a fluid storage tank), a second water pipe 9 (used as an example of a second fluid pipe), one or more valves 10, 13, 14, 15, and 16 (e.g., one-way valve), a third inlet hole 11-1, a fourth inlet hole 11-2, and another water storage tank 17 (used as an example of another fluid storage tank). In some embodiments, except for the concave lens 23, which is located above the ground, the rest of the components, mechanisms, systems can be constructed to be underground. In some other embodiments, all the elements described above can be either above the ground or under the ground. In some embodiments, the concave lens 23 is located under the ground entirely or partially.

The concave lens 23 has the structure of concentrating light so that the sunlight from the sun 24 (hereinafter referred to as an incident light IL) enters the concave lens 23 or any other types of heat or light collectors. The incident light IL is converted into the reflected light RL, which is focused on the focal point located on the optical axis OA of the concave lens 23. The focal point is the position where a heat collecting unit 22 is installed for gathering solar thermal energy. Thus, the concave lens 23 changes the propagation direction of the light. Since the heat collecting unit 22 gathering all the light rays entering the concave lens 23, the heat collecting unit 22 forms a heat source H with a high temperature, such as around 260 to 450 degrees Celsius, even up to 1100 degrees Celsius. The heat source H is used to heat water to generate water vapor. In some embodiment, the heat from the heat source H can be conducted with no loss through a thermal conductor 21. It should be noted that although only one concave lens 14 is used as an example for illustration, in other embodiments, the number of concave lenses 23 may be more, such as from 2 to 999,999.

In some embodiments, in addition to the pure solar energy to generate the heat source H, another heat source that can generate the heat source H, such as geothermal heat, garbage burning, etc., can also be combined so that when there is not enough solar energy, such as at night. It can continuously store and generate electricity in rainy days.

Referring to the water inlet unit 1, the water inlet unit 1 can get the water through an underground pipeline directly or/and use a pump to pump an amount of water or hot water to enter the water inlet unit 1. The water inlet unit 1 can be, for example, a storage tank, a container, or a container constructed with a specific material—for example, a space formed by surrounded cement. In some embodiments, the water inlet unit 1 can be directly or indirectly connected to the heat collecting unit 22 or thermal conductor 21. When the water inlet unit 1 is a highly thermally conductive storage tank, the water in the storage tank can be heated. The storage tank is continuously heated by the heat source H so that the water becomes hot water with pressure (e.g., steam). In some embodiments, the water in the water inlet unit 1 is around over 100 degrees Celsius. In some embodiments, the pressure value is between 6 kg/cm$^2$ to 10 kg/cm$^2$. In the water inlet unit 1, a pressure control is used to determine when the liquid (e.g., water) is converted into gas. For example, the condition of the gas may be converted into water vapor with a temperature of 150 degrees Celsius and a pressure value of 5 kg/cm$^2$.

In addition, through the control of controller 2, the water vapor can be discharged from a third inlet hole 11-1 and/or a fourth inlet hole 11-2, and the water vapor is cooled and converted into liquid water, and the water is guided to the water storage tank 17 via conduit 18. The water located in the water storage tank 17 can be injected into the water inlet unit 1 again for recycling. In some embodiments, the water storage tank 17 is not used. In such case, controller 2 is operated to recycle water back to the water inlet unit 1.

In another embodiment, controller 2 may be operated using electricity either from an external source, by using electricity generated herein, or a combination thereof.

Referring again to FIG. 1, the sunlight is focused on the heat collecting unit 22 through the concave lens 23 to generate thermal energy (is so-called a heat source H), and the thermal energy is conducted to the water inlet unit 1. In this embodiment, the water inlet unit 1, a controller 2, a piston 12, first inlet hole 3, second inlet hole 4, first water pipe 5, a water storage capsule 6, a generator 7, a water storage tank 8, a second water pipe 9, valves 10, 13, 14, 15, and 16, a third inlet hole 11-1, a fourth inlet hole 11-2, and another water storage tank 17 are selectively or all located under the ground entirely or partially.

As the thermal energy heats the water in the water inlet unit 1, the liquid (e.g., water) in the water inlet unit 1 is heated and converted into a gas (or water vapor). The gas is guided/controlled by controller 2. The gas enters the first inlet hole 3 to drive the piston 12 to move downward to form a thrust and then push (or squeeze) the substance in the first water pipe 5, so that the substance in the first water pipe 5 moves towards the water storage capsule 6. The substance can be a fluid (e.g., liquid, solid), gas, or any combination thereof.

In this embodiment, the piston 12 further comprises a first inlet hole 3 and a second inlet hole 4. The first inlet hole 3 and the second inlet hole 4 can be used as an injection port or a discharge port. The piston 12 is connected to the first water pipe 5 and the second water pipe 9. The steam (or gas) from the water inlet unit (may be a container) 1 goes through the controller 2 to push the piston 12 goes down, so that the steam goes out at first inlet hole 3. As the piston 12 goes downward, it pushes the water at first water pipe 5 to enter the water storage capsule 6, which in term pressurizes the gas in the water storage capsule 6. In this embodiment, the piston acts as a force generating device providing a force to drive the initial gas in water storage capsule 6 to be pressurized. Any type of force can be used to drive the initial gas in water storage capsule 6 to be pressurized. In some embodiments, the force generating device may be a heavy object.

Conversely, when the piston 12 goes up, the pressure in the water storage capsule 6 reduces. As the gas pressure (e.g., air pressure) in the water storage capsule 6 is greater than the pressure in the pipe 5, the gas (air) pushes the water out of the water storage capsule 6, which pushes the water in the first water pipe 5 out toward the generator 7 (e.g., water turbine) to generate electricity. Subsequently, water from the generator 7 goes to the water storage tank 8, the second water pipe 9, and then to the valves 10 and 16. It is worth noting that the valve 16 is a one-way valve. It makes the water only flow from the water storage tank 8 via the valve 16 to the second water pipe 9. In this embodiment, the valve 10 is also a one-way valve. It makes the water only flow from the second water pipe 9 via the valve 10 to the first water pipe 5.

The operation of the water storage capsule 6 will be described in detail below. When the water vapor enters the first water inlet hole 3, the piston 12 is pushed moving downward, so that the water in the first water pipe 5 is squeezed into the water storage capsule 6, so that the water storage capsule 6 is filled with water (in a first operational mode, valves 13 and 15 are open and valve 14 is closed) or increase its gas pressure (in the second operational mode). In this embodiment, the inlet/outlet between the water storage capsule 6 and the first water pipe 5 is provided with, for example, one or more valves (e.g., valve 15) to control the water flow and maintain the pressure. The valve 15 at the inlet/outlet of the water storage capsule 6 can determine the flow rate of water entering the water storage capsule 6 and the discharging rate of water from the water storage capsule 6. Valves can be used between any connection points or turning points throughout the Present Disclosure. For example, valves 13 and 14 can be provided on both the first water pipe 5. Valve 16 can be provided near the connection point of the water storage tank 8 and the second water pipe 9. According to the above arrangement, at least two operation modes can be provided.

The first operation mode (e.g., water volume exclusion mode) uses the water storage capsule 6 as a water container. In this first operation mode, water is filled into the water storage capsule 6 until the water storage capsule 6 is full. When more water is injected into the first water pipe 5, the water is forced to flow toward the generator 7. In some embodiments, the gas (e.g., air) contained in the water storage capsule 6 can be vented via one or more air channels (not shown).

The second operation mode (e.g., compressed air mode) is to inject the water from the first water pipe 5 into the water storage capsule 6 through the inlet/outlet (i.e., the location of the valve 15). The water injection process will cause the gas pressure inside the water storage capsule 6 to change/increase. The water is injected into the water storage capsule 6 so that the gas pressure in the water storage capsule 6 increases continuously. The valve 15 at the inlet/outlet can also control whether the water is injected into or stopped from entering the water storage capsule 6. Here, the action of "injecting" can be a process of energy storage, and the amount of energy stored can be determined by the pressure inside the water storage capsule 6. When water in the water storage capsule 6 is used to drive the generator 7 (e.g., water turbine) to generate electricity, the valve 15 at the inlet/outlet and the valve 14 can be opened, so that the water at the water storage capsule 6 is released due to the air pressure in the water storage capsule 6 (e.g., an energy release process). The water that is pushed out of the water inlet/outlet (i.e., the location of the valve 15) and then located in the water storage capsule 6 flows through a second portion of the first water pipe 5 and further drives the generator 7. In this embodiment, the energy storage is performed by controlling the gas pressure inside of the water storage capsule 6 versus the outside water pressure (e.g., in the pipe 5). The substance in the water storage capsule 6 can be in a gas or liquid form. When the substance in the first water pipe 5 is a liquid, by injecting/providing the liquid in the first water pipe 5 into the water storage capsule 6 through the inlet/outlet (i.e., the location of the valve 15), the volume of the gas of the water storage capsule 6 is reduced, thereby compressing the gas. In this embodiment, the gas may be insoluble or partially dissolved in the liquid during the compression process, but the gas compression can still be achieved. The flow of the substance located in the first water pipe 5 and the quantity of the substance entering the water storage capsule 6 can be controlled by the piston 12. The position of piston 12 is controlled by the controller 2 and the flow of the water vapor.

In the above-mentioned embodiments, next, the substance located in the first water pipe 5 can also be guided to the generator 7, and electricity can be generated by the substance acting on generator 7. For example, when the substance is a liquid, the generator 7 can be a water turbine generator, turbine, hydraulic, or hydro turbine. Electricity is generated by the liquid propelling the water turbine generator to rotate so to produce electricity. In addition, the substance in the first water pipe 5 can be controlled by the valve to control the moving path of the substance. For example, the valve can make the substance in the first water pipe 5 enter the water storage capsule 6 for compressing the gas (e.g., air), which converts the kinetic energy of substance movement into the compressed gas.

Next, after operating/closing the valve 13 (opening valves 15 and 14), the substance (e.g., water) in the first water pipe 5 moves toward the generator 7. The flow rate of water flowing out from the water storage capsule 6 can be controlled by the valve 15, so that the water located in the water storage capsule 6 is pushed out to the first water pipe 5 towards the generator 7.

In a more detailed operation mode, when the piston 12 goes up, the pressure reduces. The gas pressure at the water storage capsule 6 pushes the water out to the generator 7, and the volume of the compressed gas in the water storage capsule 6 is affected by the pressure change (e.g., an increase in its volume due to a reduced pressure), such that the original compressed gas releases the aforementioned stored energy, so that the water located in the water storage capsule 6 pushes the water located in the first water pipe 5 to form a strong thrust to push the generator 7 (e.g., water turbine) until the gas pressure in the water storage capsule 6 is exhausted/balanced (e.g., reduce to a predetermined level) or cannot efficiently drive the generator 7 to generate a predetermined rate/amount of electricity.

The substance acting on generator 7 is collected in a water storage tank 8. The substance stored in the water storage tank 8 will be returned to valve 10 through the second water pipe 9 again.

In other words, when the substance of the water storage capsule 6 no longer acts on the generator 7 or the material of the water storage capsule 6 has been consumed, the controller 2 above introduces the gas into the second inlet hole 4 of the piston 12, as shown in FIG. 1. For example, after the gas is guided by the controller 2, the gas enters the second inlet hole 4 to enter the space in the piston 12 and drive piston 12 to move upward in FIG. 1 to form a pulling force, thereby pulling the substances (such as liquid, solid, gas, or any combination of the previous, etc.) toward the direction of the first water pipe 5 and the water storage capsule 6, thereby completing the process of energy storage and power generation in the water cycle.

Figure 2:
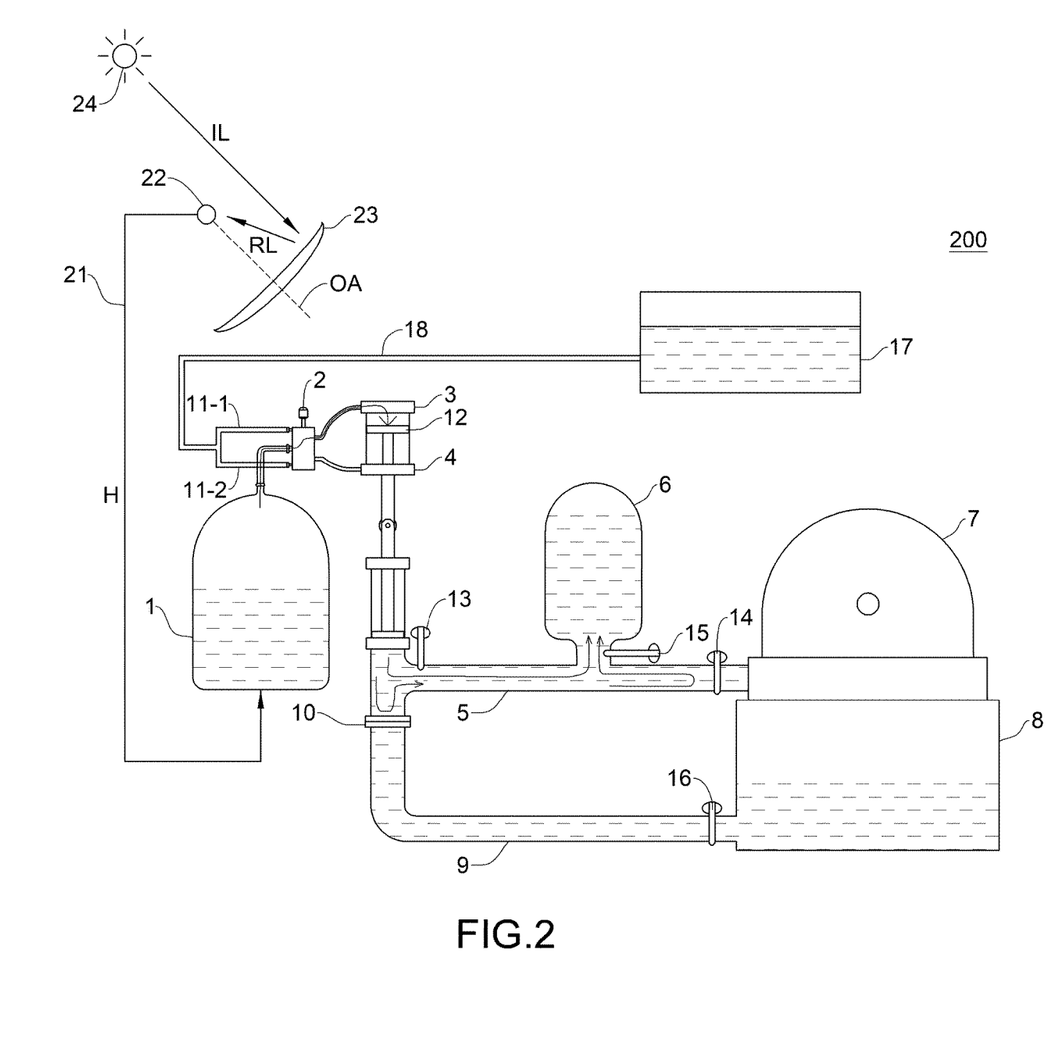
FIG. 2 illustrates an energy storage mode 200 in accordance with some embodiments.

FIG. 2 illustrates an energy storage mode 200 in accordance with some embodiments.

When the gas is guided/controlled by controller 2, the gas enters the first inlet hole 3 to drive the piston 12 to move downward in FIG. 1 to form a thrust and then push (or squeeze) the substance of the first water pipe 5. The substance (e.g., liquid) of the first water pipe 5 (e.g., liquid, solid, gas, or any combination of the previous, etc.) moves towards the water storage capsule 6. The reduced space in the water storage capsule 6 causes the pressure of the gas inside the water storage capsule 6 become higher (e.g., from 1 atm to 50-110 atm). This serves as energy storage. In this embodiment, the water storage capsule 6 is provided with a valve 15. The valve 15 is located near the connection between the water storage capsule 6 and the first water pipe 5 to determine the entry/exit of the liquid or to determine the storage/release of energy. For example, when the electrical demand is low, the valve 15 is closed so that the compressed gas in the water storage capsule 6 cannot expand or push the liquid out, thereby storing energy (e.g., pressure energy). During periods of high electricity demand, the valve 15 is opened to allow the compressed gas to expand back to its original lower pressure state (i.e., back to the initial or original pressure), thereby moving liquid to drive the generator 7 (e.g., water turbine) for generating electricity.

In this embodiment, a piston is used as an action unit. Any type of force can be used to trigger the piston to move up and down. In some embodiments, a machine is used to trigger the piston to push and pull.

In some embodiments, the action unit is coplanar with the energy storage capsule, so that the action unit and energy storage capsule are set on the same horizontal plane. In certain embodiments, the action unit, the liquid pipe, and the energy storage capsule are deposed on the same horizontal plane. As such, the energy storage system (or power generation system) is not constrained by topographical conditions.

Figure 3:
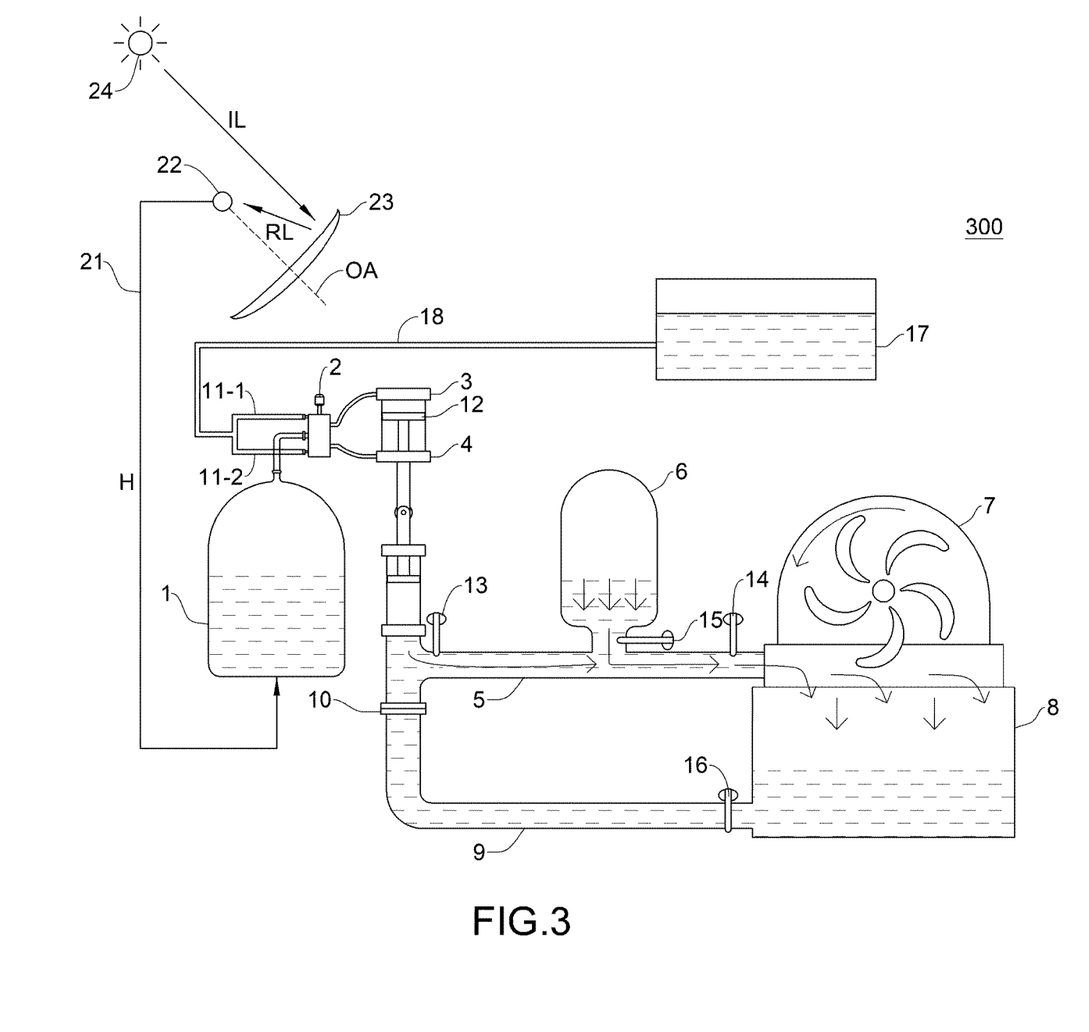
FIG. 3 illustrates an energy release/generation mode 300 in accordance with some embodiments.

FIG. 3 illustrates an energy release/generation mode 300 in accordance with some embodiments.

After operating/closing the valve 13 (while keeping valves 14 and 15 open), the substance (e.g., water) in the first water pipe 5 moves toward the generator 7, because the gas pressure in the water storage capsule 6 pushes the substance located in the first water pipe 5 to form a strong thrust to push the generator 7 until the substance in the water storage capsule 6 is exhausted (e.g., reduce to a predetermined level) or does not efficiently drive the generator 7 to generate a predetermined rate/amount of electricity. The substance located in the first water pipe 5 may be gas, liquid, solid, slurry or a combination of the previous. In this embodiment, water is used as an example of the substance located in the first water pipe 5. As shown in FIG. 3, the generator is connected to a water storage tank 8 as an example of fluid storage tank. The fluid storage tank can recover the substance (e.g., water) acting on the generator. The fluid storage tank can be a natural facility. For example, the natural facilities may be a river, a lake, etc.

Figure 4:
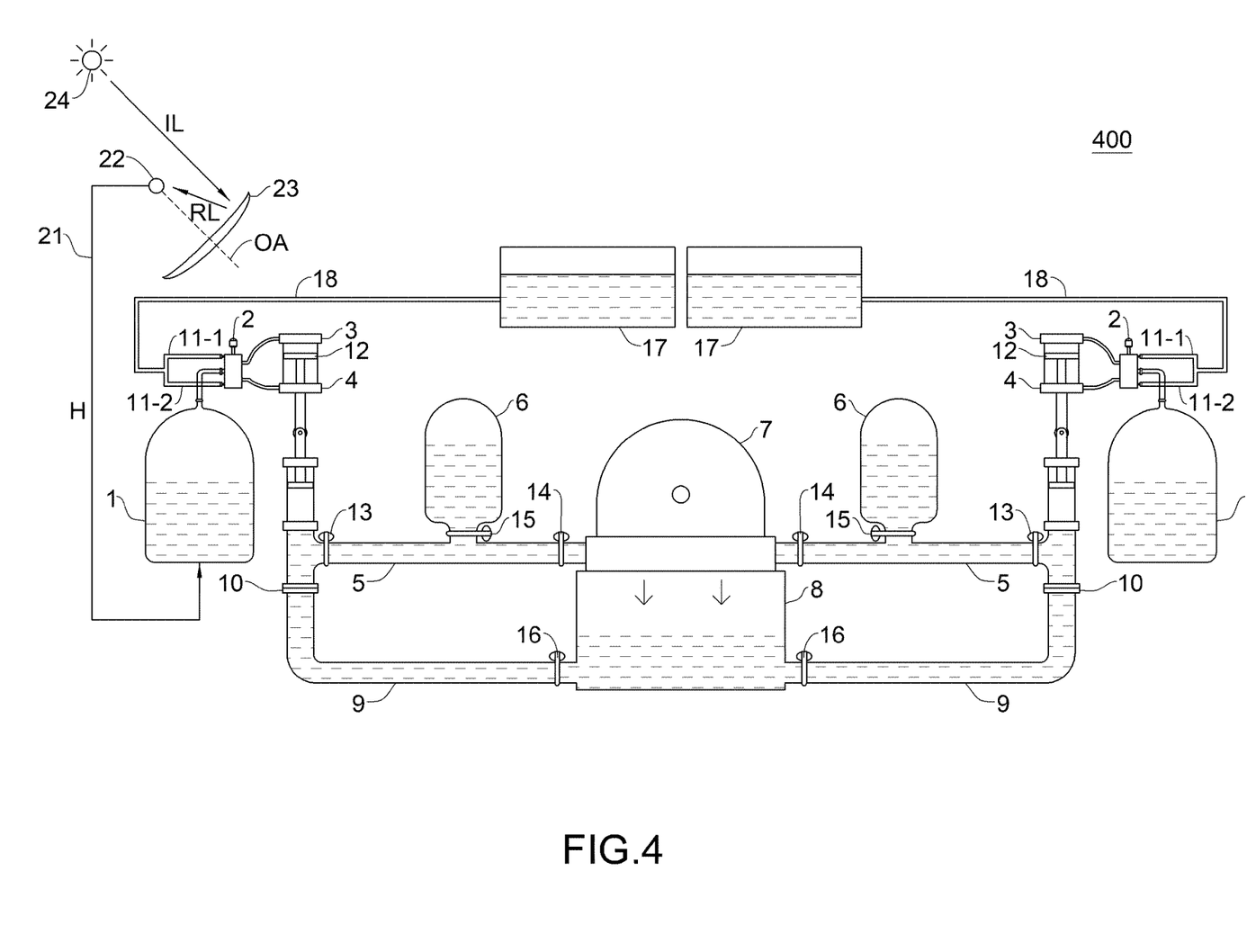
FIG. 4 illustrates an energy release/generation mode 400 in accordance with some embodiments.

FIG. 4 illustrates an energy release/generation mode 400 in accordance with some embodiments.

In FIG. 4, mode 400 shows multiple energy storage units to one hydro turbine generator (multiple-to-one). The energy storage unit can comprise an action unit, a first water pipe 5 (used as an example of a first fluid pipe), a water storage capsule 6 (used as an example of an energy storage capsule), and a second water pipe 9 (used as an example of a second fluid pipe). The energy storage/power generating system shown in FIG. 4 includes two water inlet units, two storage tanks, and two control units, but it can use only one water inlet unit, one storage tank, and one control unit. For example, in FIG. 4, both action units can be connected to the same control unit so that the other control unit can be omitted. The system may comprise one or more energy storage units. In this embodiment, the system comprises two energy storage units. The number of the energy storage units and the associated hydro turbine generators can be adjusted according to the user's needs.

In FIG. 4, piston 12 can be replaced with a heavy object (e.g., a stone with a certain weight). The weight of the heavy object can be from 40 kg to 60 kg. The weight of heavy object can be adjusted as needed, such as from 1 kg to 100 tons. When a heavy object is used as an action unit, the heavy object is dropped from a higher position to create a thrust. In some embodiments, the dropping of the heavy object can be triggered by a machine. With the thrust, the energy storage/generation process in FIG. 1 can be implemented as described above. The heavy object can be pushed back to its original position (higher position) by a mechanical force and the process of energy storage and power generation can be repeated.

Figure 5:
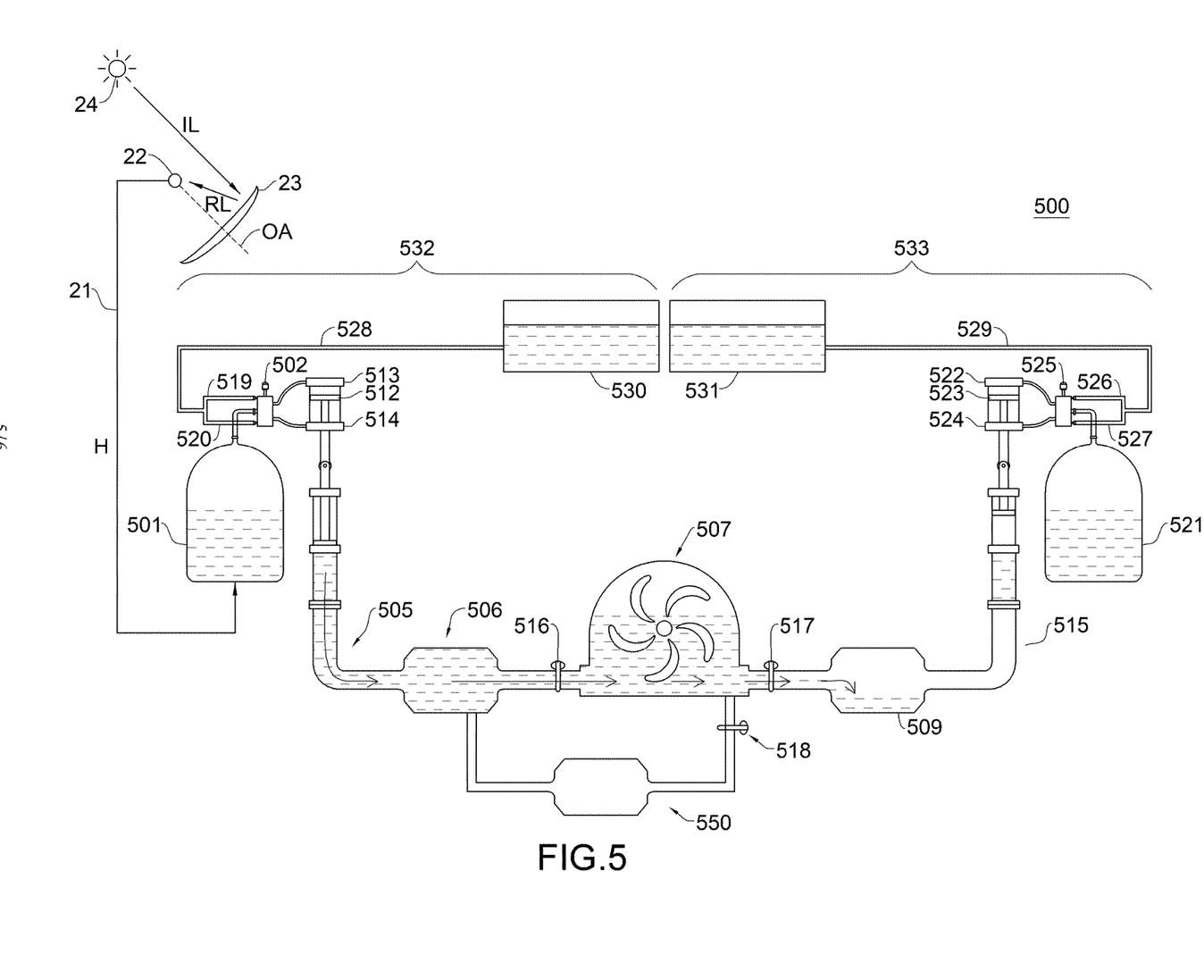
FIG. 5 illustrates a solar thermal energy converter 500 in accordance with some embodiments.

FIG. 5 illustrates a solar thermal energy converter 500 in accordance with some embodiments.

The solar thermal energy converter 500 disclosed below can be combined with the energy storage described above in FIG. 1-4, so that a system can perform both solar thermal energy conversion and storage. The solar thermal energy converter 500 can be driven/powered by solar thermal energy. In another embodiment, the solar thermal energy converter 500 can be driven/powered by geothermal heat and hot groundwater/steam.

In the FIG. 5, the solar thermal energy converter 500 includes a first water inlet unit 501, a second water inlet unit 521, a first controller 502, a second controller 525, a first piston 512, a second piston 523, a first set of first inlet hole 513, a second set of first inlet hole 522, a first set of second inlet hole 514, a second set of second inlet hole 524, a first water pipe 505, a second water pipe 515, a first liquid storage vessel 506, a generator 507 (e.g., hydrogenerator), a second liquid storage vessel 509, one or more valves 516, 517 and 518, and the first and second water storage tanks 530 and 531.

The solar thermal energy converter 500 can include a first operational unit 532 and a second operational unit 533. The first operational unit 532 and the second operational unit 533 can jointly work, taking alternative turns for electricity generation, as a non-stop electricity generation system.

In operation, the solar thermal energy is conducted to the first water inlet unit 501 through the thermal conductor 21. The solar thermal energy heats water in the first water inlet unit 501 to form water vapor. The water in the first water inlet unit 501 may be groundwater. In some embodiments, the groundwater is heated by geothermal energy.

In water inlet unit 501, the water inlet unit 501 can use a pump to pump an amount of groundwater to enter the water inlet unit 501 through a water pump or other structures/methods. The first water inlet unit 501 can be, for example, a storage tank, a container, or a container constructed with a specific material—for example, a space formed by surrounded cement. After the first water inlet unit 501 injects groundwater, the groundwater becomes hot water with pressure (e.g., steam), in the first water inlet unit 501, for example, there is groundwater of 150 to 180 degrees Celsius (° C.). The pressure value is between 6 kg/cm² to 10 kg/cm². In the first water inlet unit 501, the pressure change is used to convert the liquid into a gas. For example, the condition of the gas may be converted into water vapor with a temperature of 150 degrees Celsius (° C.) and a pressure value of 6 kg/cm².

In FIG. 5, as an example, when the gas is guided/controlled by controller 502, the gas enters the first inlet hole 513 and the inside space of the piston 512 to drive the piston 512 (e.g., via the gas pressure) to move downward in FIG. 5 to form a thrust and then push (or squeeze) the liquid (e.g., water) of the first water pipe 505. The substance (e.g., liquid) of the first water pipe 505 (e.g., liquid, solid, gas, or any combination of the previous, etc.) moves towards the first liquid storage vessel 506. The gas (or steam) formed in the first water inlet unit 501 can be guided by controller 502 to guide the gas to the inlet holes 513 and 514 to drive a movement of the piston 512.

In this embodiment, the piston 512 further provides a first inlet hole 513 and a second inlet hole 514. The first inlet hole 513 and the second inlet hole 514 can be used as an injection port or a discharge port. The piston 512 is connected to the first water pipe 505.

Valves 516, 517, and 518 can control the flow of the fluid stream.

Thus, in a first unit 532 electricity generation mode, the liquid in the first water pipe 505 is pushed, via the space reduced that is occupied by the piston 512, toward the first liquid storage vessel 506. Since the first liquid storage vessel 506 is full of liquid, the extra incoming liquid is pushed toward the hydrogenerator 507 generating electricity. The liquid that passed through the hydrogenerator 507 is stored at the second liquid storage vessel 509. When the extra liquid (the volume of liquid moved by the space reduction of the piston) from the first operational unit 532 is consumed or depleted, the second operational unit 533 starts to move the second piston 523 to a pushed mode, which is like the operational manner of the first operation unit 532 described earlier. Thus, the first operational unit 532 and the second operational unit 533 take turns forming a non-stop and continuous solar thermal energy converter, which converts the solar thermal energy or any other type of thermal/pressure into electricity.

In a receiving mode, the piston 512 is move upward by having the steam going through a first set of second inlet hole 514, so that the first piston is moving upward (e.g., a withdraw mode), so that the liquid is moving back toward the first operational unit 532. The receiving mode in the second operational unit 533 works similar to the receiving mode of the first operational unit 532.

In some embodiments, the first operational unit 532 can be constructed in a stand-alone unit (e.g., without the second operational unit 533) by having a returning unit 550 controlled by valve 518. In such construction, valve 517 (e.g., closed) can be the stop point/separation point to have the above stand-alone unit.

After the gas (or the water vapor, the steam) acts on the first set of the first inlet hole 513 and the first set of the second inlet hole 514 of the first piston 512 of the first operational unit 532, it can pass through a first set of the third inlet hole 519 and a first set of the fourth inlet hole 520 of the first controller 512 to enter another water storage tank 530 to be cooled. Similarly, the gas (or the water vapor, the steam) acts on the second set of the first inlet hole 522 and the second set of the second inlet hole 524 of the second piston 523 of the second operational unit 533, it can pass through a second set of the third inlet hole 526 and a second set of the fourth inlet hole 527 of the second controller 525 to enter another water storage tank 531 to be cooled. The water temperature of the cooled water vapor is reduced to, for example, about 60 degrees (° C.) and is further discharged into the bottom of the ground layer, which can avoid land collapse or concave, it can also continuously generate heated groundwater through geothermal heat.

Figure 6:
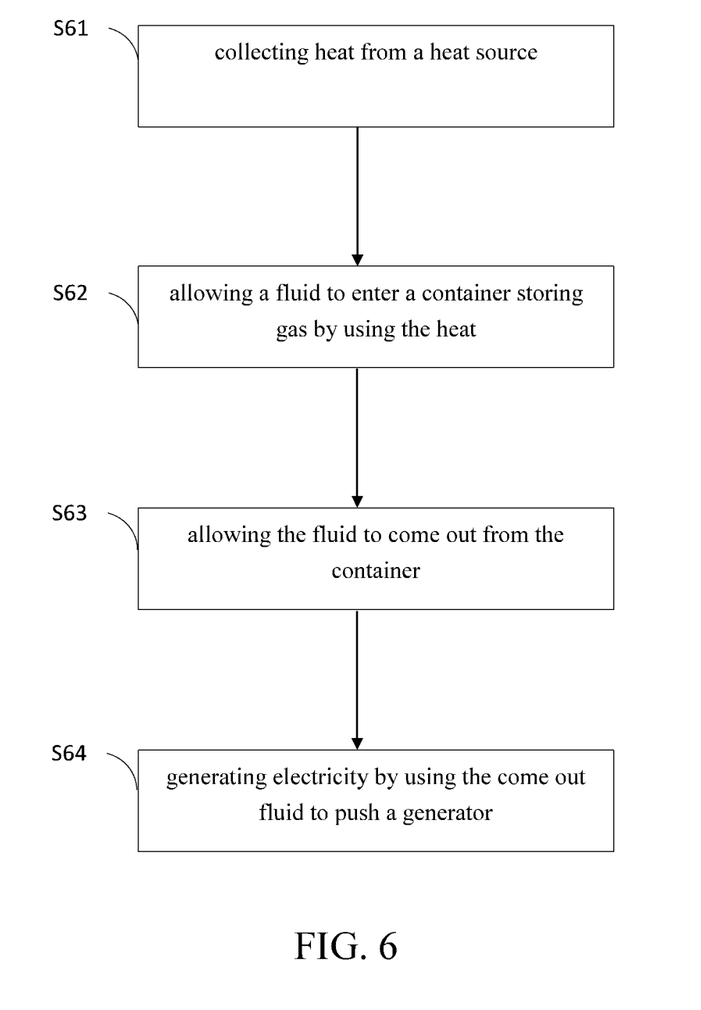
FIG. 6 is a flow chart illustrating an energy storage method in accordance with some embodiments.

FIG. 6 is a flow chart illustrating an energy storage method in accordance with some embodiments. In FIG. 0.6, the method starts at Step S61. At Step S61, the method includes collecting heat from a heat source. The heat source may be solar energy, geothermal energy, or waste heat. In some embodiments, the heat is collected by using a concave lens.

At Step S62, the method includes allowing a fluid to enter a container storing gas by using the heat. Specifically, the method uses the heat to generate steam, which pushes the fluid to enter the container by using a piston. As the fluid enters the container, the gas stored in the container is compressed to store the pressure energy. Accordingly, Step S62 may be thought of as an energy storage phase. In some embodiments, the gas stored in the container may have an initial pressure ranging from 30 atm to 80 atm. The fluid may be gas or liquid (e.g., water). In this embodiment, the fluid is liquid. The liquid may comprise water. In some embodiments, the gas stored in the container comprises air.

At Step S63, the method includes allowing the fluid to come out from the container. Specifically, the method releases the pressure energy stored in the compressed gas to drive the fluid (e.g., liquid) to come out from the container.

At Step S64, the method includes generating electricity by using the come out fluid to push a generator. Specifically, the pressure energy released at Step S63 is transferred to the generator through the fluid to generate electricity.

The present invention has been disclosed in the preferred embodiments above, but those skilled in the art should understand that this embodiment is only used to describe the present invention and should not be construed as limiting the scope of the present invention. It should be noted that all changes and substitutions equivalent to this embodiment should be included in the scope of the present invention. Therefore, the protection scope of the present invention shall be defined by the scope of the patent application.

What is claimed is:

1. A concentrated solar power storage system comprising:
   a heat collecting unit configured to gather a solar thermal energy;
   a container configured to store water and convert the water into steam by the solar thermal energy;
   a valve configured to determine a flow direction of the steam;
   a heavy body configured to generate a force through the valve;
   a capsule for accommodating a gas;
   a generator;
   a fluid storage tank;

a first fluid pipe for accommodating a fluid, the first fluid pipe being connected to the capsule, the generator, and the fluid storage tank, wherein the first fluid pipe is coupled with the capsule in parallel such that the fluid moving through the first fluid pipe is able to bypass the capsule; and a second fluid pipe connected to the heavy body and the fluid storage tank, wherein the force is configured to push the fluid located in the first fluid pipe to compress the gas;

wherein the generator is configured to generate electricity by using the compressed gas to push the fluid located in the first fluid pipe;

wherein the fluid storage tank is configured to receive the fluid acting on the generator; and wherein the fluid located in the first fluid pipe is configured to push the generator until gas pressure in the capsule is reduced to a predetermined level when the fluid no longer acts on the generator.

2. The concentrated solar power storage system according to claim 1, wherein the heat collecting unit utilizes one or more concave lenses to gather the solar thermal energy.

3. The concentrated solar power storage system according to claim 1, wherein the heavy body comprises a piston and a plurality of piston holes, and the piston generates the force.

4. The concentrated solar power storage system according to claim 1, wherein the heavy body is a piston.

5. The concentrated solar power storage system according to claim 1, further comprising another fluid storage tank to collect the steam and convert the steam into a liquid.

6. The concentrated solar power storage system according to claim 1, wherein the container, the valve, the heavy body, the capsule, the generator, the fluid storage tank, the first fluid pipe and the second fluid pipe are positioned underground.

* * * * *